Figures 1, 2, 3:
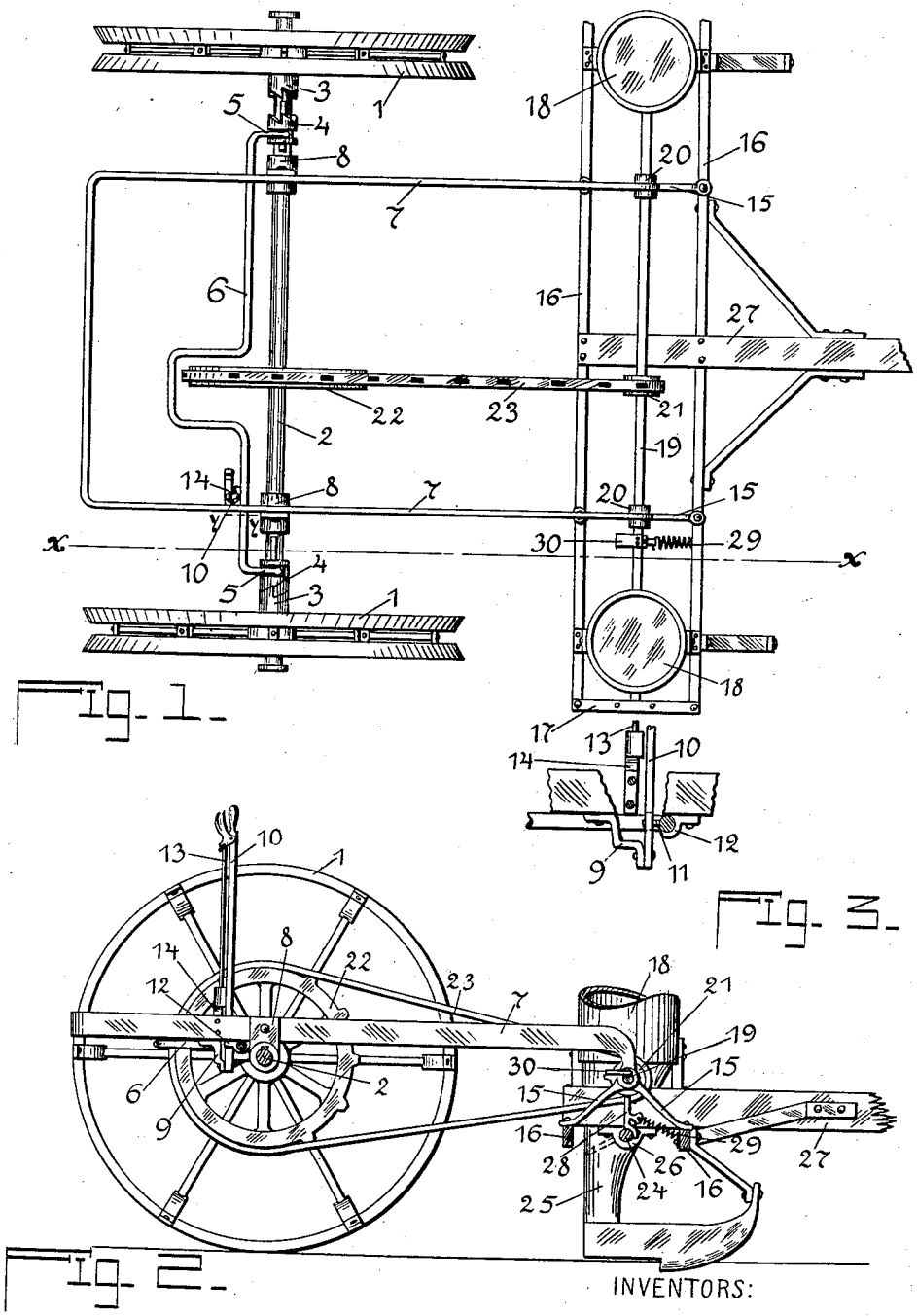

M. & S. ROBINSON & W. A. DAVIS.
CORN AND COTTON PLANTER.
APPLICATION FILED MAY 13, 1911.

1,076,234.

Patented Oct. 21, 1913.

WITNESSES:

INVENTORS:
Marcus Robinson,
Samuel Robinson,
William A. Davis.
BY
ATTORNEY

COLUMBIA PLANOGRAPH CO., WASHINGTON, D. C.

UNITED STATES PATENT OFFICE.

MARCUS ROBINSON, SAMUEL ROBINSON, AND WILLIAM A. DAVIS, OF CHICO, TEXAS.

CORN AND COTTON PLANTER.

1,076,234. Specification of Letters Patent. Patented Oct. 21, 1913.

Application filed May 13, 1911. Serial No. 627,085.

*To all whom it may concern:*

Be it known that we, MARCUS ROBINSON, SAMUEL ROBINSON, and WILLIAM A. DAVIS, citizens of the United States, residing at Chico, in the county of Wise and State of Texas, have invented certain new and useful Improvements in Corn and Cotton Planters, of which the following is a specification.

Our invention relates to new and useful improvements in corn and cotton planters. Its object is to provide a corn and cotton planter carrying a complete mechanism by which the seed valves may be opened at regular intervals, so that the seed will be planted in equidistant hills.

The object is more specifically to provide a mechanism operated from the axle of the planter, which mechanism will include a revolving trip lever, adapted to contact once during each rotation with an arm by which the seed valve is opened.

Finally the object of our invention is to provide a device of the character described that will be strong, durable, simple and efficient and comparatively easy to construct, and also one that will not be likely to get out of working order.

With these and various other objects in view, our invention has relation to certain novel features of the construction and operation, an example of which is described in the following specification and illustrated in the accompanying drawing, wherein:

Figure 1 is a plan view of the herein described corn and cotton planter. Fig. 2 is a sectional elevation of the same, the upper portion of the seed can being broken away, and the section being taken upon the line x—x of Fig. 1. Fig. 3 is a detail sectional elevation taken upon the line y—y of Fig. 1, and showing the lever mechanism for operating clutches by which the wheels may be made fast or loose upon the axle.

Referring now more particularly to the drawing, wherein like numerals of reference designate similar parts in all the figures, the numeral 1 denotes the transporting wheels, which are loose upon an axle 2, and are provided with clutch members 3 upon the inner ends of their hubs. A clutch member 4 is splined upon the axle adjacent to each clutch member 3, and the two sliding clutch members 4 are engaged by yokes 5 carried upon the two extremities of a transverse rod 6, which rod permits the clutch members 4 to be simultaneously displaced in such a manner as to make one wheel loose upon the axle and the other fast, or vice versa. The frame of the machine consists in a U shaped metal bar 7, having its two parallel members resting transversely upon the axle, which passes through bearings 8 secured to said members, and the transverse member of the frame being at the rear of the machine. A bracket 9 is mounted upon the under surface of the frame 7 adjacent to the right hand bearing 8, and serves to furnish a pivotal support for the lower extremity of a lever 10. Said lever engages a pin 11, projecting horizontally from the cross bar 6, and a transverse angular displacement of the lever about its pivotal support, thus produces a transverse rectilinear displacement of the rod 6, by which the clutches are opened and closed. Slide bearings 12 are provided upon the under surface of the longitudinal members of the frame 7 to guide the rod 6 during transverse displacement. The lever 10 carries a vertical rod 13, the lower extremity of which may be made to engage either one of two slots provided in a quadrant 14 projecting from the frame 7, adjacent to the bracket 9.

The forward extremities of the frame 7 are turned down and bifurcated, forming bracket arms 15 which are rigidly mounted upon a pair of adjacent beams 16 parallel with the axle, and connected by members 17 at their extremities. The members 16 and 17 form a frame transverse with the main frame, and extending outwardly some distance beyond the latter at each side, furnishing a support for the seed cans 18, one of which is mounted in front of each wheel. The agitator mechanism not shown within the seed cans is operated by a shaft 19, rotatably mounted in bearings 20 formed at the juncture of the bracket arms 15 with the extremities of the frame 7. Rotation may be communicated to the shafts 19 from the axle of the machine through a pair of sprocket wheels 21 and 22, and a sprocket chain 23. Beneath the shaft 19 is mounted a rock shaft 24, passing through the discharge chute 25, which extends downwardly beneath each seed can, and having its extremities mounted in bearings secured to the under side of the rear extremity of the tongue 27. The rock shaft 24 serves to operate the usual mechanism within the seed chutes, for which no novelty is claimed in the present invention. A small arm 28 projects upward from the rock shaft 24, and is normally held in vertical position by the tension of a spring 29. The arm 28 is adapted to be engaged periodically by a lever 30 projecting from the shaft 19, and contacting with the aforesaid arm once during each revolution.

From the above description the operation of the device is evident. The chain and sprocket wheel mechanism comprising the parts 21 22 and 23, which mechanism is adapted to be operated from either transporting wheel, communicates a rotation to the shaft 19. A periodic angular displacement is communicated to the rock shaft 24 from the shaft 19 through the trip lever 30 and the arm 28, and said rock shaft operates the ordinary mechanism for opening the seed valve.

It is apparent that various changes may be made in the details of the above construction and in the proportion of parts, and the invention is, therefore, presented as including all such changes and modifications as come within the scope of the following claim.

What we claim is:

In a planter, the combination with a frame, an axle supporting the frame, seed cans carried by the frame, seed-dropping mechanism carried by the frame, a chain and sprocket connection between the axle and the seed-dropping mechanism, and ground wheels loosely mounted on the axle, of clutch hubs carried by the wheels, clutch members splined on the axle, and arranged to alternately engage the clutch hubs, a rigid yoke extending between and engaging the clutch members at its ends, said yoke having an offset portion receiving a portion of the chain and sprocket connection, said yoke being held against rotation and rotatably receiving the clutch members, bearings on the frame in which the yoke is mounted to slide, a lever pivoted on the frame and also pivoted to the yoke, and means for locking the lever in its adjusted positions.

In testimony whereof we have signed our names to this specification in the presence of two subscribing witnesses.

MARCUS ROBINSON.
  SAMUEL ROBINSON.
  WILLIAM A. DAVIS.

Witnesses:
 A. L. SIMMONS,
 T. B. STACK.